(12) United States Patent
Quintile et al.

(10) Patent No.: US 6,354,577 B1
(45) Date of Patent: *Mar. 12, 2002

(54) COMPOSITE MATERIAL SPRING MODULES WITH INTEGRALLY FORMED ATTACHMENT FITTINGS

(75) Inventors: Mark J. Quintile, Brunswick, OH (US); Eugen Constantinescu, Greensboro, NC (US); Robert F. Wagner, Medina, OH (US)

(73) Assignee: Sealy Technology LLC, Trinity, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/260,823

(22) Filed: Mar. 2, 1999

Related U.S. Application Data

(63) Continuation of application No. 08/843,927, filed on Apr. 17, 1997, now abandoned, which is a continuation-in-part of application No. 08/487,022, filed on Jun. 7, 1995, now Pat. No. 5,720,471.

(51) Int. Cl.[7] .................................................. F16F 1/36
(52) U.S. Cl. .......................................... 267/149; 267/81
(58) Field of Search ................................. 267/148, 149, 267/81, 95, 96, 103, 104, 106, 107, 109–111, 143, 151; 5/247, 255, 690

(56) References Cited

U.S. PATENT DOCUMENTS 323,224 A * 7/1885 Johnson

| 488,378 | A | * | 12/1892 | Bell |
| 2,239,062 | A | * | 4/1941 | Tallmadge |
| 2,242,731 | A | * | 5/1941 | Tallmadge |
| 2,503,333 | A | * | 4/1950 | Gyles |
| 2,979,739 | A | * | 4/1961 | Krakauer |
| 3,895,896 | A | * | 7/1975 | White et al. ................... 425/93 |

(List continued on next page.)

FOREIGN PATENT DOCUMENTS

EP           0 494 839 A1    7/1992

*Primary Examiner*—Robert J. Oberleitner
*Assistant Examiner*—Xuan Lan Nguyen
(74) *Attorney, Agent, or Firm*—Arter & Hadden LLP

(57) ABSTRACT

Composite material spring modules and methods of manufacture are described having a fiber reinforced composite material spring body with attachment fittings integrally formed about the spring body. The attachment fittings are molded of a flexible material which dynamically responds to changes in the shape of the spring body upon deflection. Integral formation of the fittings with the spring body provides a unified single piece module which is readily attachable to any structure where spring support is desired. The composite material spring modules exhibit the properties of stiffness and return to uncompressed state from total depth deflection without set. The composite material spring modules with integrally formed fittings are described a mattress foundation, by attachment to high and low profile frames and to an overlying grid. Methods of manufacture of the composite material spring modules with integrally formed attachment fittings are described. Methods of assembly of flexible weight bearing structures such as mattress foundations using the composite material spring modules with integrally formed attachment fittings are also described.

45 Claims, 13 Drawing Sheets

U.S. PATENT DOCUMENTS

| | | | | |
|---|---|---|---|---|
| 3,993,726 A | * | 11/1976 | Moyer | 264/174 |
| 4,168,194 A | * | 9/1979 | Stiles | 156/166 |
| 4,245,362 A | * | 1/1981 | Mueller | |
| 4,251,892 A | * | 2/1981 | Hancock | |
| 4,411,159 A | * | 10/1983 | Spear et al. | |
| 4,519,591 A | * | 5/1985 | Bush et al. | |
| 4,530,490 A | * | 7/1985 | Misumi et al. | |
| 4,620,401 A | * | 11/1986 | L'Esperance et al. | 52/309.15 |
| 4,736,932 A | * | 4/1988 | Haslim | |
| 5,054,751 A | * | 10/1991 | Brown | |
| 5,100,201 A | * | 3/1992 | Becker, III et al. | 297/300 |
| 5,165,125 A | * | 11/1992 | Callaway | |
| 5,265,291 A | * | 11/1993 | Callaway | |
| 5,405,159 A | * | 4/1995 | Klein et al. | 280/283 |
| 5,407,344 A | * | 4/1995 | Rombalski et al. | 425/190 |
| 5,426,799 A | * | 6/1995 | Ottiger et al. | |
| 5,499,410 A | * | 3/1996 | Assink | |
| 5,588,165 A | * | 12/1996 | Fromme | 5/247 |
| 5,622,357 A | | 4/1997 | Schultz | |
| 5,720,471 A | * | 2/1998 | Constantinescu et al. | 267/81 |
| 5,927,696 A | * | 7/1999 | Hagemeister | 267/105 |
| 6,134,729 A | * | 10/2000 | Quintile et al. | 5/263 |

* cited by examiner

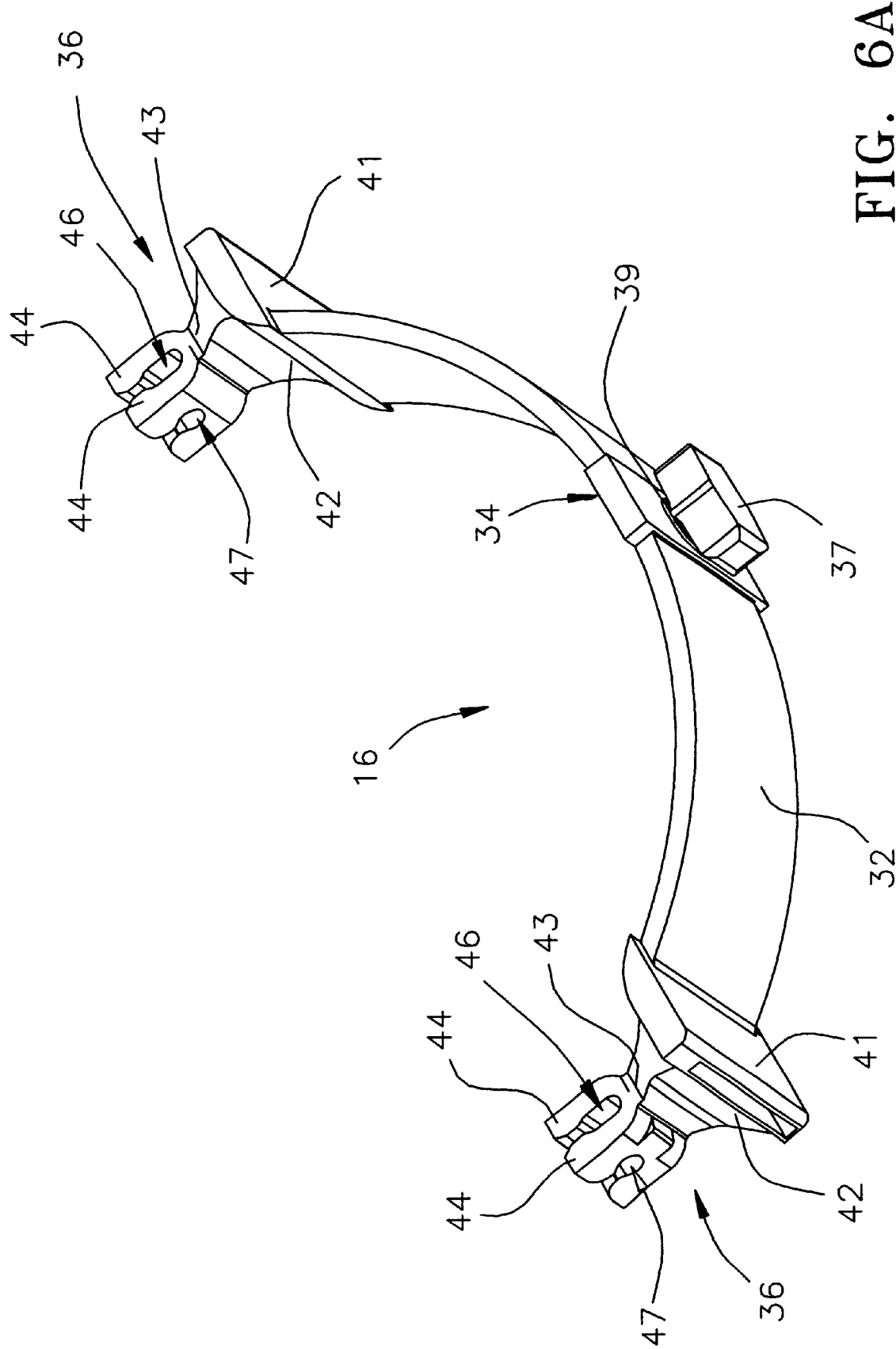

COMPOSITE MATERIAL SPRING MODULES WITH INTEGRALLY FORMED ATTACHMENT FITTINGS

This application is a continuation of Application Ser. No. 08/843,927, filed Apr. 19, 1997 now abandoned, which is a continuation-in-part of Application Ser. No. 08/487,022 filed Jun. 7, 1995 now U.S. Pat. No. 5,720,471.

FIELD OF THE INVENTION

The present invention pertains generally to plastic composite material springs for use as flexible elements in weight bearing structures, and more particularly for use in flexible human eight bearing structures such as bedding and seating and furniture.

BACKGROUND OF THE INVENTION

Springs for use as flexible support elements in support structures such as seating and bedding and furniture have traditionally and conventionally been constructed of spring steel and wire. See, for example, U.S. Pat. Nos. 188,636; 488,378; 1,887,058; 4,535,978; 4,339,834; 5,558,315. Attempts have been made to construct spring support elements out of plastic material. See, for example U.S. Pat Nos. 4,530,490; 4,736,932; 5,165,125 and 5,265,291. Although fiber reinforced plastic springs are fairly well-developed, the use thereof in flexible support structures such as seating, furniture and bedding presents the formidable engineering challenge of providing suitable means for attachment of the springs to a frame structure and an overlying support surface. Plastic springs have heretofore been simply mechanically attached to a supporting structure such as described in U.S. Pat. No. 4,411,159 on a fiber reinforced plastic leaf spring for a vehicle. Any type of mechanical attachment is complicated by the extreme hardness and stiffness of fiber reinforced plastics. Ultimately it is nearly always necessary to drill attachment holes in the spring for a mechanical fastener (such as described in U.S. Pat. No. 4,736,932) requiring additional manufacturing and assembly steps. Also, drilling through the fiber-reinforced structure breaks the preferred long strand/roving fibers which are critical to providing optimal spring characteristics. The related application discloses clips for attachment of mattress foundation springs to a frame and an overlying grid. Although fully operative and novel, this approach requires additional parts and increased assembly tasks, and does not entirely overcome the negatives of possible slippage between the spring and the clips, and noise generation by such relative motion.

Conventional bedding systems commonly include a mattress supported by a foundation or "box spring". Foundations are provided to give support and firmness to the mattress as well as resilience in order to deflect under excessive or shock load. Foundations are typically composed of a rectangular wooden frame, a steel wire grid supported above the wooden frame by an array of steel wire springs such as compression type springs which are secured to the wooden frame. In order to properly support and maintain the firmness level in the mattress, a large number of compression springs are needed in the foundation, resulting in high production cost. This is the main disadvantage of using compression springs in mattress foundations. Also, foundations which use compression springs typically have a low carbon wire grid or matrix attached to the tops of the springs. Both the wires and the welds of the matrix can be bent or broken under abusive conditions. In such steel/metal systems, fasteners are required to secure the springs to the grid and to the frame. This leads to metal-to-metal contact which can easily produce squeaking sounds under dynamic loading.

In an effort to avoid the high cost of using compression springs in foundations, another type of spring used is the torsional steel spring formed from heavy gauge steel spring wire bent into multiple continuous sections which deflect by torsion when compressed. See for example U.S. Pat. Nos. 4,932,535; 5,346,190 and 5,558,315. Because torsional springs are dimensionally larger and stiffer than compression springs, fewer torsional springs are needed in the foundation. However, the manufacture of torsional-type springs from steel wire requires very expensive tooling and bending equipment. Elaborate progressive bending dies are required to produce the complex torsional spring module shapes which may include four or more adjoining sections. The manufacturing process is not economically adaptable to produce different spring configurations without new tooling, tooling reworking and/or machinery set-up changes and process disruption, etc. Therefore, the configuration and resultant spring rate of such springs cannot be easily or inexpensively altered to produce foundations with different support characteristics. Furthermore, the many bends in these types of springs make dimensional quality control and spring rate tolerance control very difficult to achieve. Also, variations in steel material properties and the need for corrosion protection and heat-treating add to the cost and difficulty of producing steel wire spring modules. And furthermore, the awkward geometry of the relatively large torsional springs makes assembly of the springs in the foundation frame relatively difficult.

Another disadvantage of the use of steel wire springs in foundations, and a particular disadvantage of torsional springs, is the phenomenon of "spring set" in which a spring does not return completely to an uncompressed height following excessive loading. So long as a spring is deflected within its spring rate tolerance range, it can be repeatedly loaded for a certain number of cycles without noticeable change in operating characteristics. However, if deflected past the maximum deflection range, it will undergo permanent deformation or "set", resulting in a permanent change in operating characteristics such as lack of reflexive support, permanent change in shape, or catastrophic failure in the form of breakage. Spring set in steel wire springs may also occur simply following prolonged normal use, i.e., continuous heavy loading. This phenomenon is also generally referred to as fatigue and can result in catastrophic failure.

Mattresses of increased thickness dimension such as "pillow-top" mattresses, when placed on top of traditional foundations of six to eight inch height, can be too high in proportion to the head and foot boards of beds, resulting in an awkward appearance and an excessively high sleeping surface. This trend toward larger mattress and foundations increases distribution and storage costs. Mattress foundations in the United States typically measure on the order of five to eight inches thick, with an average thickness (or height) of six and one half to seven and one half inches. In conventional foundations, most all of this dimension is attributable to the height of the wire spring modules. In general, deflection of torsional wire spring modules is limited to approximately 20% of the total height dimension. Compression which exceeds the 20% range can cause spring set or breakage. Reducing the overall height of torsional spring modules can make the springs too rigid and diminishes the desired deflection characteristics and ability to absorb heavy loads with recovery. Moreover, the number of cycles to failure during life testing is generally harder to predict with shortened height spring wire modules and is usually many less cycles to failure than spring wire modules of greater height. Nonetheless, it would be desirable to have a foundation with reduced height while retaining the desired support and deflection characteristics.

SUMMARY OF THE INVENTION

The present invention provides composite material spring modules for use as flexible support elements in support structures such as seating and bedding. The composite material spring modules include a spring body composed of a plastic enveloping and cured about reinforcing fibers, and a second plastic or polymeric material from which attachment fittings are integrally formed or molded about or bonded to the spring body. For spring modules for a mattress foundation, the attachment fittings are selectively configured for mechanical engagement with elements of a foundation frame structure and a grid or support structure which overlies the frame structure. The integral formation of plastic attachment fittings about the spring body eliminates the need for physically separate fasteners to secure the springs to a surrounding assembly such as a frame and a grid. The material of the attachment fittings may be the same or different than the plastic material of the spring body.

The invention further enables production of novel low profile/low height abuse resistant and long life mattress foundations which incorporate the composite material spring modules with integral attachment fittings. The composite material spring modules are used in place of traditional wire springs as the principle reflexive support components. In one embodiment, the total height of a low composite material mattress foundation is approximately 50–60% of the height of traditional foundations, yet has improved deflection/resilience characteristics over traditional foundations. The invention further provides a high profile or conventional height mattress foundation which uses composite material spring modules mounted upon a novel high profile frame.

The invention further includes a novel method of manufacturing- foundation spring modules from composite materials such as epoxy/polyester and fiberglass combinations, by molding such materials in various spring shapes particularly adapted and especially suited for use as support elements in a mattress foundation. As used herein the term "composite" means a combination of at least two materials mixed together in a solid form, such as any plastic material which can be molded, extruded or pultruded and a fibrous material bonded or encased or otherwise attached to the plastic material. The term "composite" also refers to the integral formation of attachment fittings from a moldable material about a spring body having encapsulated fibers. The invention still further includes a novel method of selective assembly of mattress foundation units using composite material spring modules wherein the spring modules are selectively arranged upon and fixedly attached to a frame structure and to an overlying grid.

In a preferred embodiment of the spring modules, composite material is pultruded in a generally planar elongate spring module to provide a low depth/height dimension and efficient stress and load distribution. The use of molded/pultruded composite material spring modules, and in particular the planar elongate configuration of the composite material spring module, provides numerous manufacturing and assembly advantages over prior art wire springs, including simplified foundation construction, module manufacturing and handling, and ready adaptability to automated manufacturing and assembly processes for both sub-assembly and final assembly of foundation units. Furthermore, the novel method of manufacturing foundation spring modules from composite materials is readily adaptable to the manufacture of a wide variation of spring modules having different shapes and support and deflection characteristics with varying spring rates, without substantial retooling or modification of the fundamental process. The process allows very high reproducibility of performance characteristics.

The invention further includes novel high profile and low profile foundation frames for supporting spring modules and an overlying grid. A low profile frame has parallel longitudinal and central members, transverse members with a major width parallel to major widths of the longitudinal members, and end facia boards with a major width orthogonal to the major widths of the transverse members. A high profile frame has parallel longitudinal perimeter and central members, and transverse members and end facia boards attached orthogonally to the longitudinal members, with major widths of the transverse members and facia boards perpendicular to widths of the longitudinal members, and a narrow bottom edge of the facia boards flush with bottom surfaces of the longitudinal members.

The invention further provides a novel mattress foundation grid crosswire or transverse member having horizontal offsets dimensioned to engage attachment fittings of spring modules to restrict movement of the attachment fittings along the length of the crosswire. The invention still further provides a composite material mattress foundation grid borderwire support spring configured for attachment to a frame member and for frictional engagement with a flexible support of a grid borderwire.

These and other aspects of the invention are herein described in particularized detail with reference to the accompanying Figures

BRIEF DESCRIPTION OF THE DRAWINGS

In the accompanying Drawings:

FIG. 6A is a perspective view of an alternate embodiment of a composite material spring module with integrally formed attachment fittings of the present invention;

DETAILED DESCRIPTION OF PREFERRED AND ALTERNATE EMBODIMENTS OF THE INVENTION

Figure 1A:
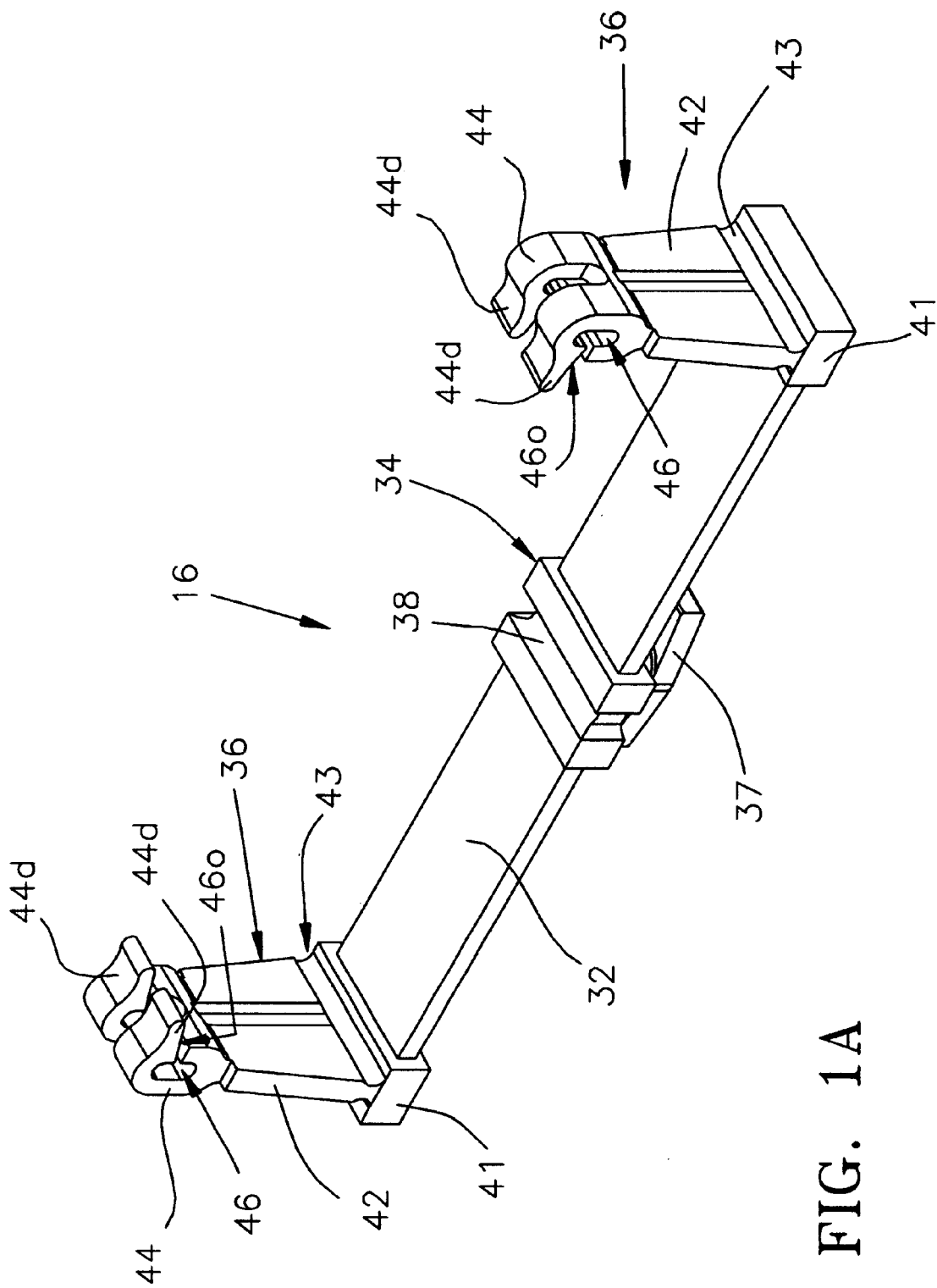
FIGS. 1A–1C are perspective views of composite material spring modules with integrally formed attachment fittings of the present invention.
Figure 1B:
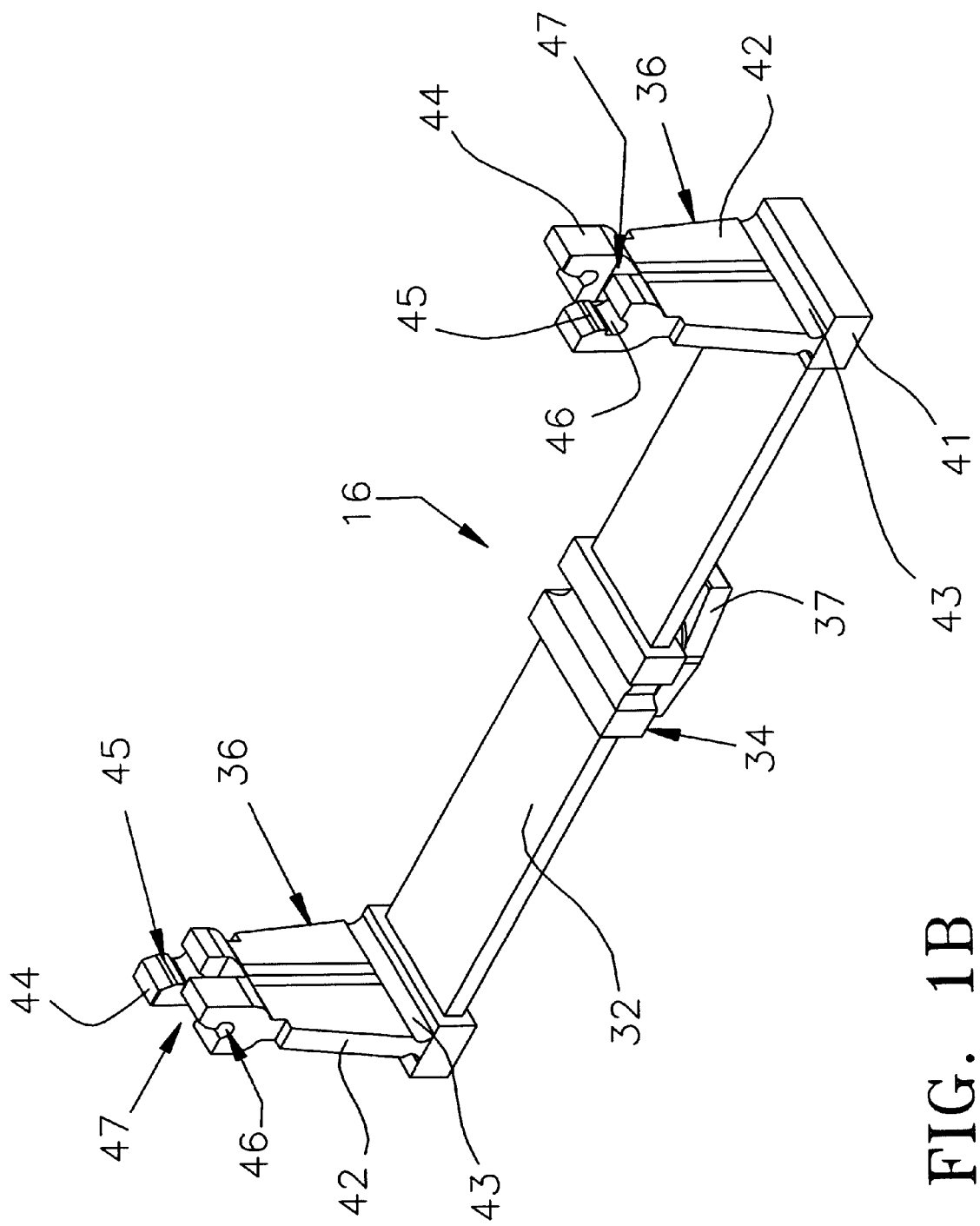
Figure 1C:
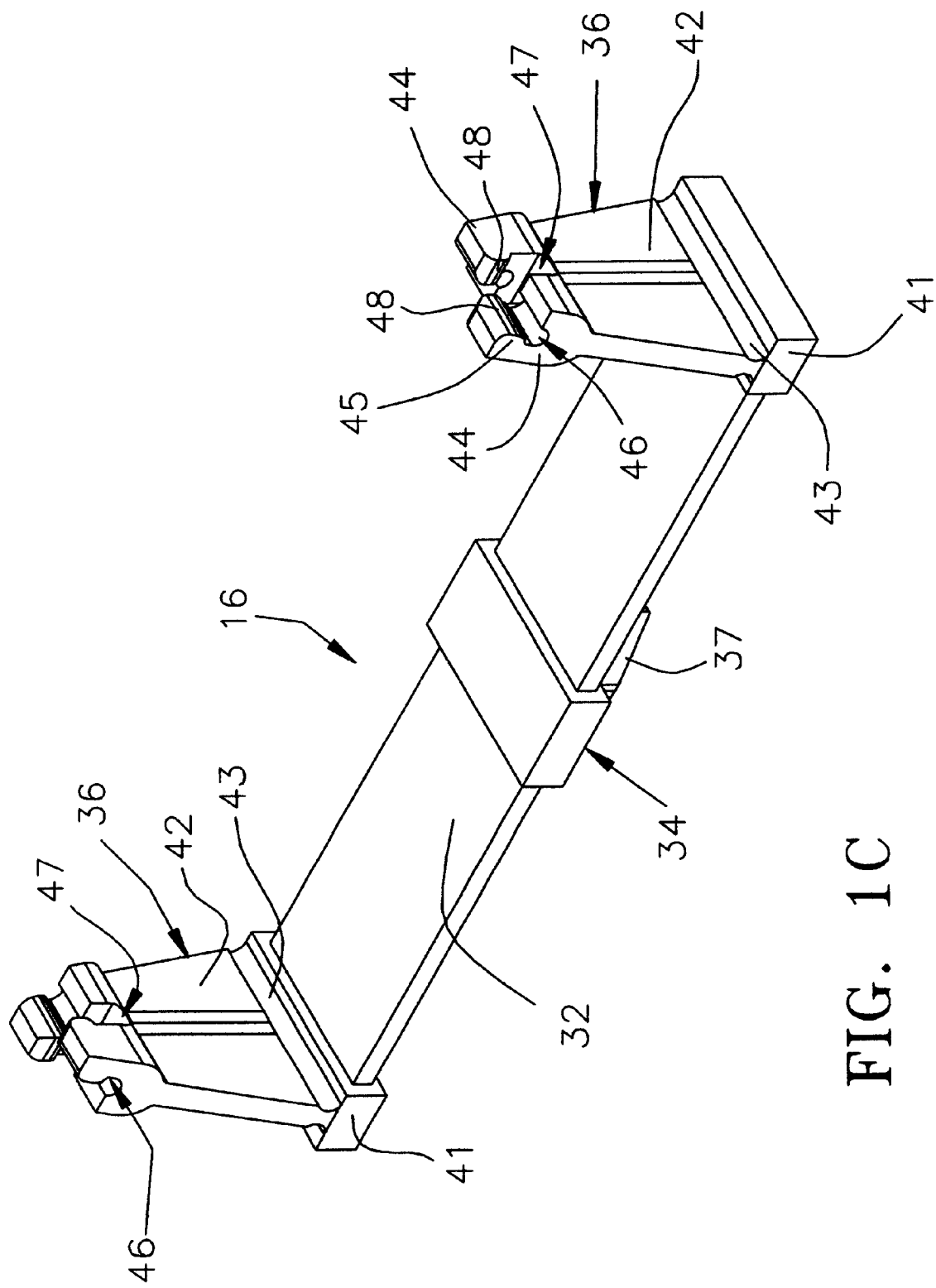

FIGS. 1A–1C illustrate preferred embodiments of a composite material spring module 16 of the invention having a generally planar elongate composite material fiber-reinforced plastic spring body 32, an integrally formed centrally disposed frame attachment fitting 34, and integrally formed grid attachment stanchion fittings 36 at opposite distal ends of body 32. Frame attachment fitting 34 and stanchion fittings 36 (herein collectively referred to as "attachment fittings") may be made of any structurally suitable material, such as plastic or metal, and molded around, bonded, fastened or secured to body 32 at the respective positions. In the preferred embodiment, attachment fittings 34 and 36 are integrally formed about the spring body 32 by an insert molding process. For example, a spring body 32 (of the simple planar, rectangular configuration shown or any of the other configurations described herein and in the related application) is placed in a mold having a cavity for receiving body 32 and connected cavities in the forms of fittings 34 and 36. The mold is then injected with any suitable moldable material such as polypropylene, polyethylene Santoprene™, nylon or ABS partially or completely encapsulating the spring body 32. Alternatively, the entire module 16 (including the body 32 and fittings 34, 36) may be molded as a single piece such as from fiber reinforced plastic material. Also, the fittings could be separately molded or pultruded and then bonded (glued) to the spring module body.

The spring module body 32 may be produced from a wide variety of composite materials such as fiber reinforced plastic, fibers in combination with epoxy or vinyl or polyesters, high density plastic such as polyethylene, high density plastic foam, encapsulated steel and steel alloys, or any other material which exhibits the desired spring rates and cycle duration. When made of a fiber-reinforced composite material, the modules may be compound molded and/or compression molded into the configuration of a male/female mold cavity under heat and pressure, or pultruded. For example, continuous fiberglass strands, approximately 60% to 80% of the product volume, are saturated with a resin system by winding or pultrusion through a bath of epoxy or vinyl ester which is approximately 20% to 40% of the product volume. The material is then loaded into a compression mold, molded and cured. Flash is removed by conventional methods such as a vibrating pumice bed. The molding material can be selected and blended to produce modules of different spring rates.

The spring bodies of generally linear configuration such as that of FIG. 1, are preferably formed by a pultrusion process wherein the reinforcing fibers are drawn through a bath of the plastic material in a liquid state and through a die which defines the cross-sectional configuration of the body, and the spring body is cut to the desired length. Pigments can be used in the molding material to readily identify modules of different spring rates, which greatly aids the assembly process described below. As used herein, the term "composite" refers to the combination of the plastic material of the spring body and the fibers in the spring body. The term "composite" also herein refers to the combination of the third material which is molded about the spring body to form the attachment fittings, as described below in detail.

Certain configurations of the composite material spring modules, as further disclosed below, may be formed by pultrusion and continuous pultrusion of, for example, fiber-reinforced plastic wherein fiber strands (including but not limited to glass fibers, Kevlar®, Mylar®, graphite, carbon or steel strands) are pulled from a reel through a resin impregnating bath, and continuously pulled through a forming and curing die. The continuous strand of composite material is then cut transversely (i.e., along the cross-section of the part) to any desired length to provide the finished spring body. Pultrusion is especially well suited for very high volume mass production of spring bodies having substantially linear configurations. Curvilinear spring module configurations may be pultruded and/or pultruded and compression molded as described. Another significant advantage of formation of spring modules by these processes is the ability to easily alter the spring characteristics of modules simply by altering the number of fibers, and/or the location or orientation of the fibers within the modules. In the preferred embodiment, the fibers are aligned with a length dimension of the module, and extend substantially the entire length of the module body. In alternate embodiments, the fibers are oriented to intersect at fixed or random angles.

The attachment of the composite material spring modules 16 with integrally formed attachment fittings will now be described in the context of mattress foundations having an underlying frame structure which supports the spring modules, and an overlying grid reflexively supported by the spring modules. However, it will be appreciated that it is well within the scope of the invention to attach the spring modules to any type of supporting structure or framework, and to optionally attach any type of structure or assembly to the spring modules whereby the spring modules provide a reflexive surface or object. Some specific examples of structures and assemblies to which the spring modules may be attached include all types of furniture, seating including vehicle and aircraft seating, energy absorbing walls, floors or other surfaces such as vibration dampening supports, and suspension systems.

Figure 2:
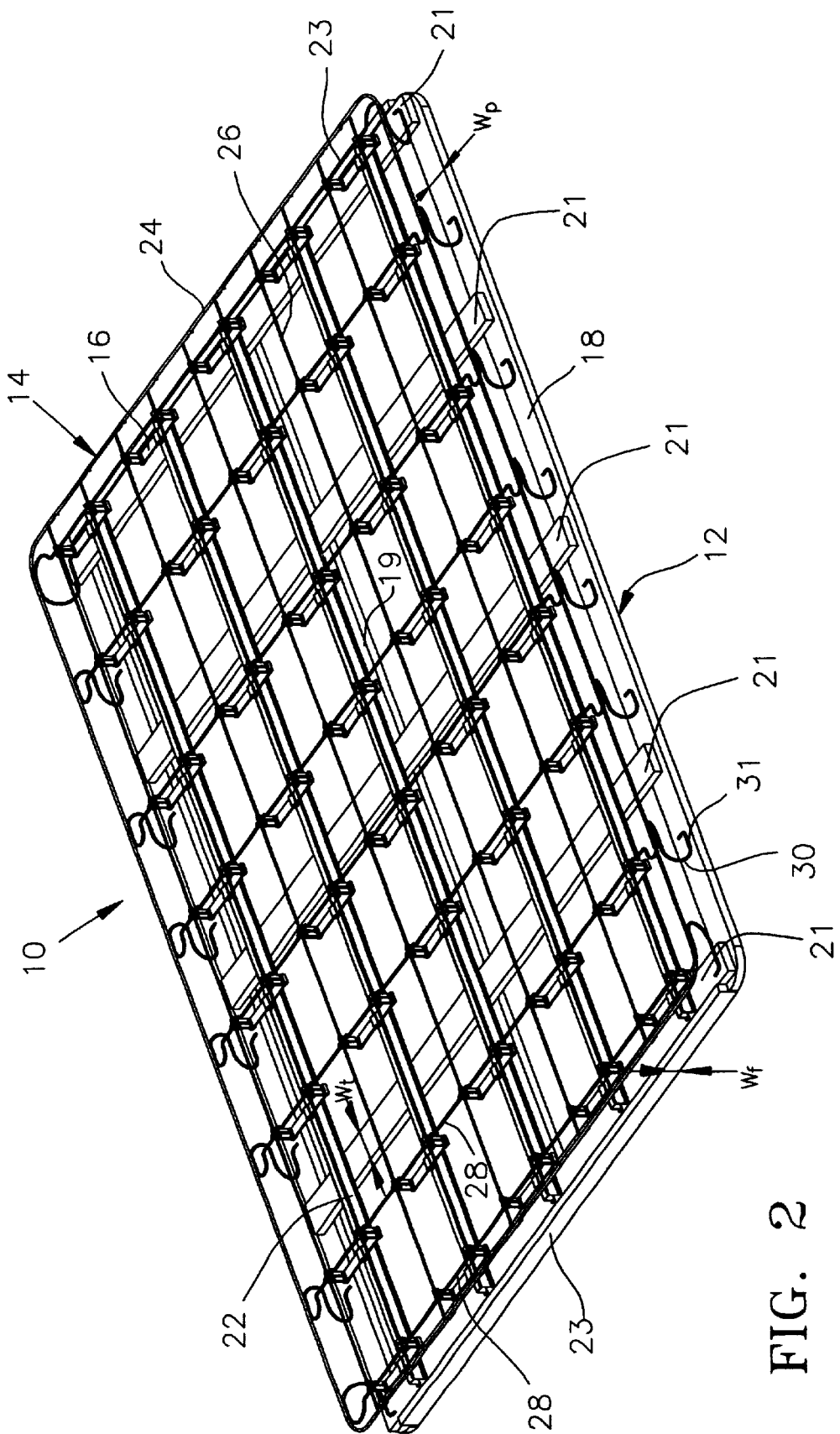
FIG. 2 is a perspective view of a mattress foundation having composite material spring modules with integrally formed attachment fittings of the present invention.

FIG. 2 illustrates one embodiment of a low profile mattress foundation of the invention having a plurality of composite material spring modules 16 constructed in accordance with the invention. The foundation 10 includes a novel low profile frame, indicated generally at 12 which supports a plurality of composite material spring modules 16 attached to a grid or matrix 14 disposed parallel to and above frame 12 as a mattress supporting surface. In this embodiment, frame 12 includes two longitudinally extending perimeter members 18, a central longitudinal member 19, and a plurality of intermediate transverse members 21, all of which may be constructed of wood or steel or metal such as aluminum or other suitable materials such as pultruded or extruded beam-like parts or blow-molded or structural foam parts, and secured together to form a rectilinear frame. In the low profile frame the transverse members 21 are laid flat with a major width w, parallel to and flush against the major widths we, of longitudinal members 18 and 19, and the narrow edges e orthogonal to the top surfaces of members 18 and 19. A plurality of longitudinally extending upper longitudinal frame members 22 (which may be constructed of wood or steel, or extruded or pultruded plastic such as polyethylene or polypropylene, PVC or fiberglass reinforced plastic) are attached orthogonal to the major widths $w_t$ (top surfaces) of transverse members 21. An end facia board or strip 23 is attached to each transverse end of the frame, against the outer narrow edge of the transverse perimeter members 21 at the ends of the longitudinal perimeter members 18. A major width $W_f$ of facia board 23 is thereby perpendicular to the major width $w_t$ of end transverse members 21 and a bottom narrow edge of the facia board is flush with bottom surfaces of the longitudinal members. The bottom edge of the facia strip 23 is flush with the bottom surfaces of the perimeter frame members to create a smooth continuous surface for attachment of upholstery. The facia board 23 may extend vertically above the end transverse members 21 to provide a chock against which the ends of upper longitudinal frame members 22 abut. With the upper longitudinal frame members 22 cut to equal length, abutment of the ends against the facia strips 23 insures that the frame will be checked and square when assembled. The spring modules 16 are attached to top surfaces of the upper longitudinal frame members 22 as further described below.

The grid 14 is formed by a peripheral border element 24 also called a "borderwire", of generally the same width and length dimensions of frame 12, a plurality of longitudinal elements 26 secured to the border element by clips or welds or simply bent or hooked around the borderwire 24, and a plurality of transverse grid elements 28 (also referred to herein as "crosswires") which intersect longitudinal elements 26 to define a generally orthogonal grid 14 which forms a support surface for a mattress. The grid 14 (including elements 24, 26 and 28) may alternatively be constructed of low carbon or high carbon steel, but may alternatively be formed of composite material such as fiber reinforced plastic which is then glued or ultrasonically welded or otherwise fastened in an orthogonal matrix or other arrangement, or formed as a single integrated structure by plastic or composite material molding processes suitable for relatively large structures such as rotational molding or injection molding of structural foam.

The terminal ends of transverse elements or crosswires 28 are downwardly bent to form vertical support elements 30 with mounting feet 31 secured to frame 12 to support the peripheral borderwire 24 and clipped to the grid 14 over frame 12. Support elements 30 may be selectively formed to any desired height above frame 12 to extend from the borderwire 24 to members 18 and to deflect in the manner of a spring as is known in the art.

As further shown in FIG. 2, the grid 14 is supported over frame 12 by the plurality of spring modules 16 attached at a bottom point to upper longitudinal frame members 22 and at upper points about the intersection of elements 26 and 28 of grid 14. As further shown in FIGS. 1A–1C and FIGS. 3A and 3B, each of the grid attachment stanchion fittings 36 include a base 41 secured to or formed about a distal end of module body 32, an upright member 42 (also referred to as a "stanchion") attached at one end through a flexible hinge 43 to base 41, and a pair of gripping fingers 44 at an opposite end of the upright stanchion member 42 configured to attach about a longitudinal grid member 26 and to straddle the transverse grid member 28 at the intersections with longitudinal grid member 26, as shown close up in FIGS. 3A and 3B. In this embodiment, the longitudinal grid member 26 overlaps transverse grid member 28 to lock it into channel 47.

Figure 3A:
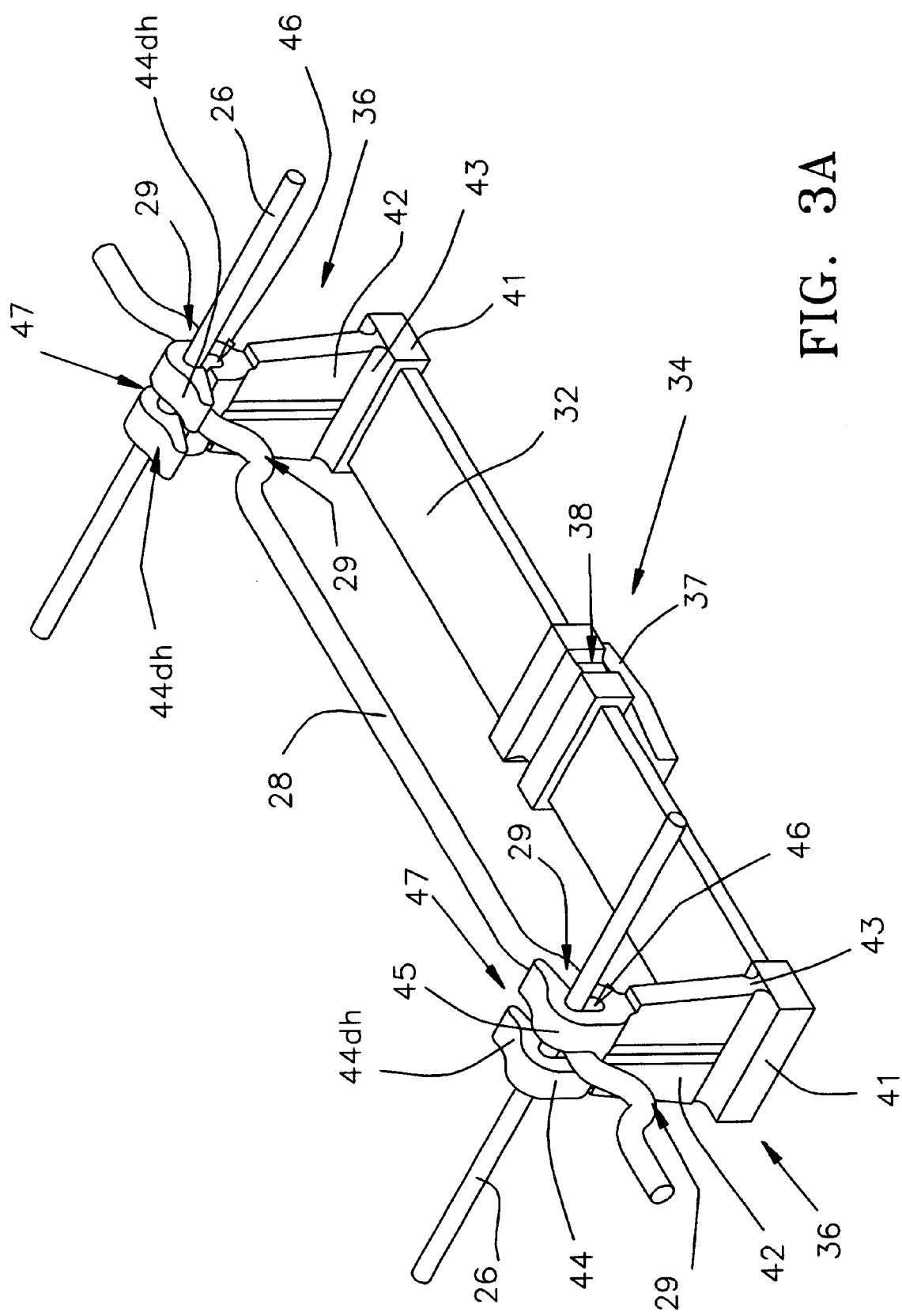
FIGS. 3A and 3B are perspective views of composite material spring modules of the invention engaged with intersecting members of a mattress foundation grid.
Figure 3B:
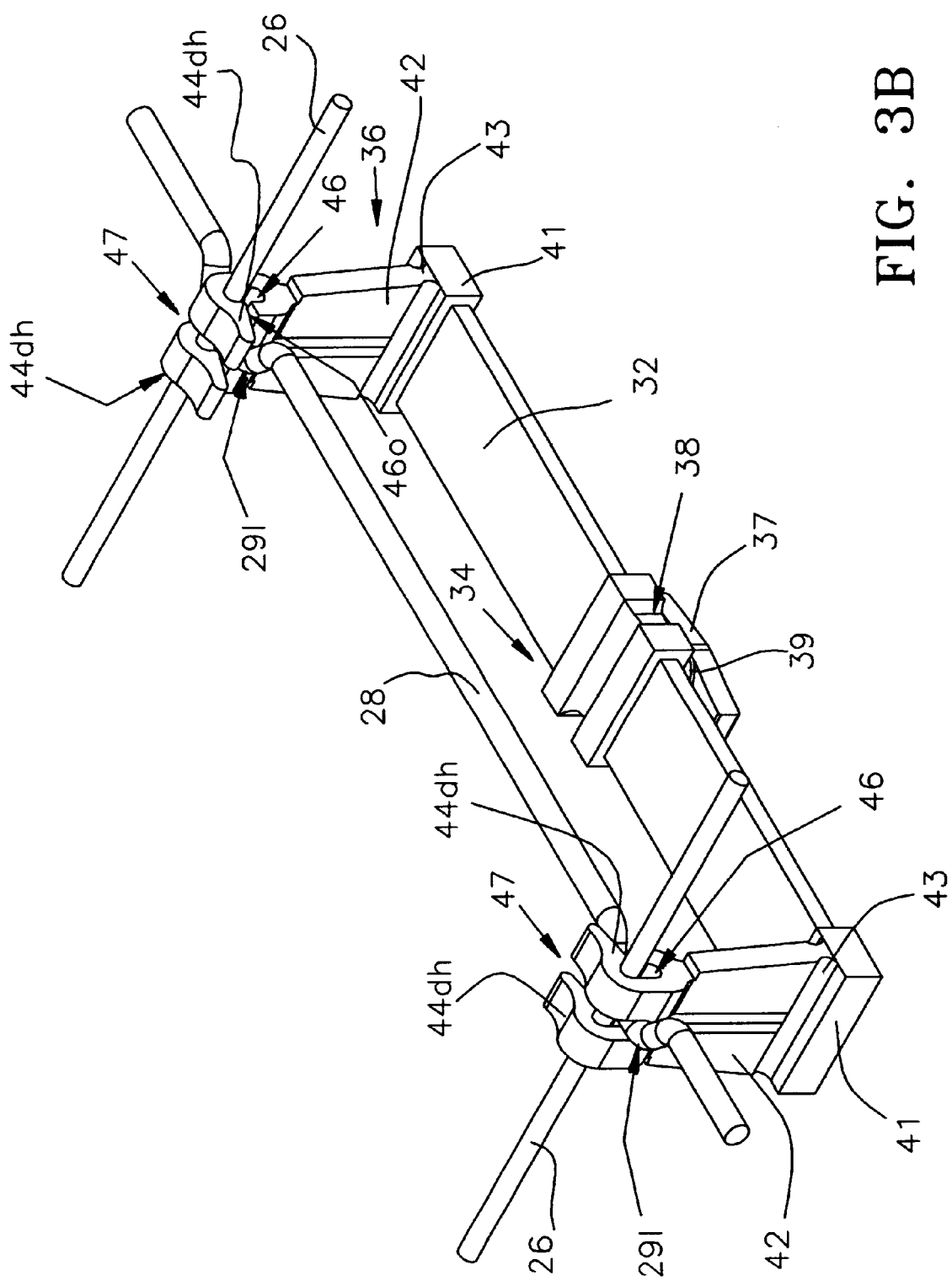

On the grid attachment stanchion fittings of the spring modules of FIG. 1A and FIGS. 3A–3B, each of the gripping fingers 44 include a laterally extending locking tab $44_{dh}$ which is generally aligned with the length of the module body 32 and extends over an interior side opening $46_o$ into channel 46 in which a longitudinal grid member 26 is received in the foundation assembly. The interior side opening $46_o$ allows the longitudinal grid members 26 to easily enter channel 46, and the locking tabs $44_{dh}$, each formed with a downwardly canted underside, guides the grid members 26 through opening $46_o$ into channel 46. Preferably, the height of opening $46_o$ is less than a cross sectional width of member 26, whereby the locking tabs $44_{dh}$ are forced upward as the member 26 passes through opening $46_o$, and then snap down to capture and retain grid members 26 within channel 46.

As shown in FIG. 1B, each of the gripping fingers 44 can alternately be formed with a radiused head 45 which extends over channel 46 dimensioned to receive and frictionally engage grid member 26, similarly, a second channel 47, orthogonal to channel 46, is dimensioned to receive transverse grid member 28. As shown in FIG. 1C, second radiused heads 48 may be provided which extend over channel 47 to frictionally engage transverse member 28.

As shown in FIG. 3A, vertically offset notches 29 in transverse member 28 are spaced to closely straddle the upper distal end of upright member 42 to restrict movement of the grid attachment fittings along the length of transverse member 28. The grid attachment stanchion fittings 36 flexibly secure the intersecting grid members 26 and 28 in the correct relative positioning and facilitates rapid assembly of the foundation. The flexible hinge 43 disposed between the spring module body and the grid enables multi-dimensional live response to any load placed on the grid. Formation of the entire grid attachment stanchion fitting of a flexible plastic is particularly advantageous for the infinite degrees of load deflection, and the complete elimination of any possibility of noise generation at the gripping finger 44/grid attachment interface.

As shown in FIG. 3B, the invention further includes a transverse grid member 28 or crosswire having horizontal lateral offsets 291 of a linear extent sufficient to traverse the second channel 47 which runs between gripping fingers 44. By this arrangement, the grid attachment stanchion fittings 36 are restricted from lateral displacement along longitudinal grid members 26, and from movement along the length of crosswire 28. Furthermore, the horizontal lateral offsets 291 are overlapped by a portion of the locking tabs 44 which strengthens the mechanical engagement of the intersecting grid members within the attachment fittings. The lateral offsets 291 are horizontal in the sense that they extend laterally in a plane defined by the top surface of a grid in which the crosswire 28 is incorporated.

Figure 6B:
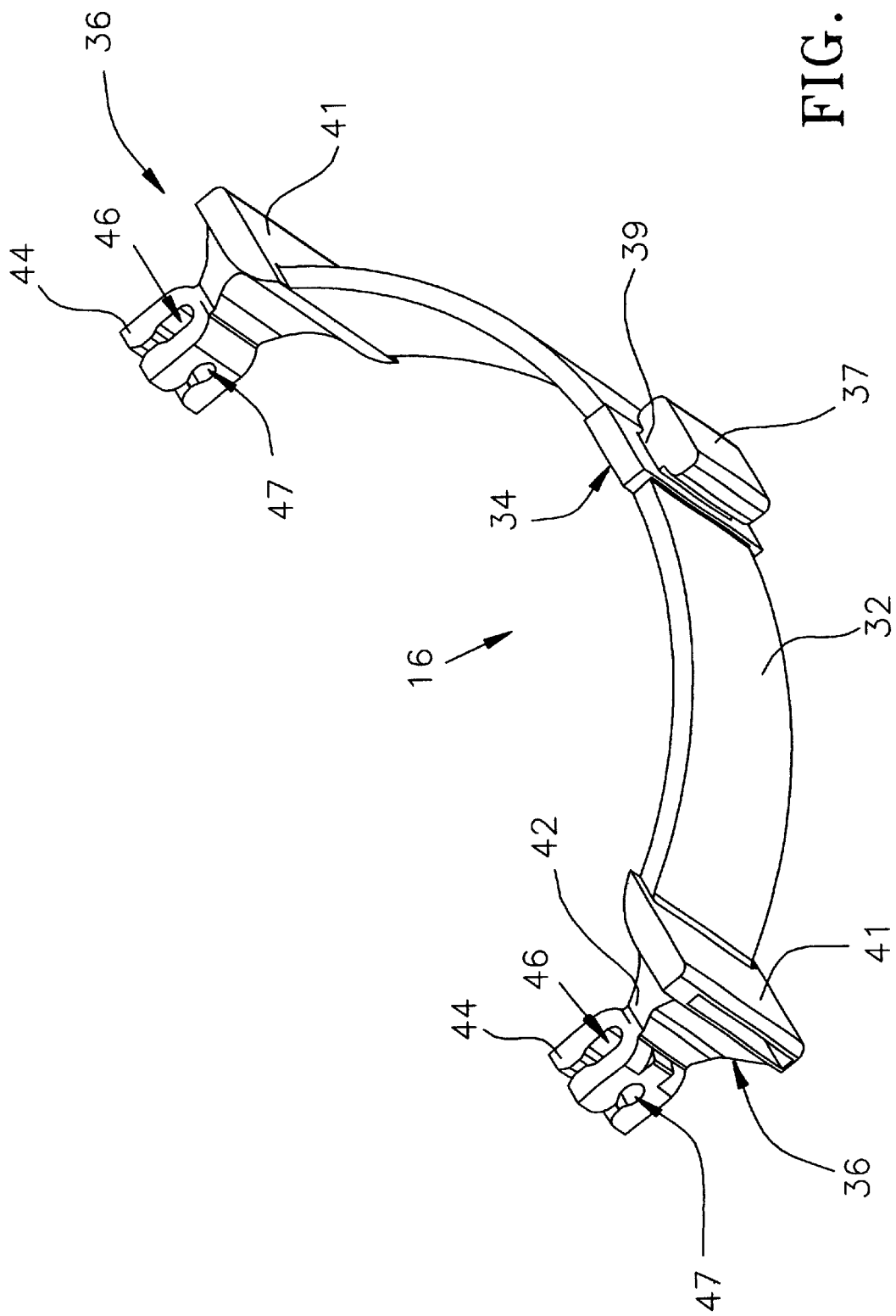
FIG. 6B is a perspective view of another embodiment of a spring module of the invention.
Figure 6C:
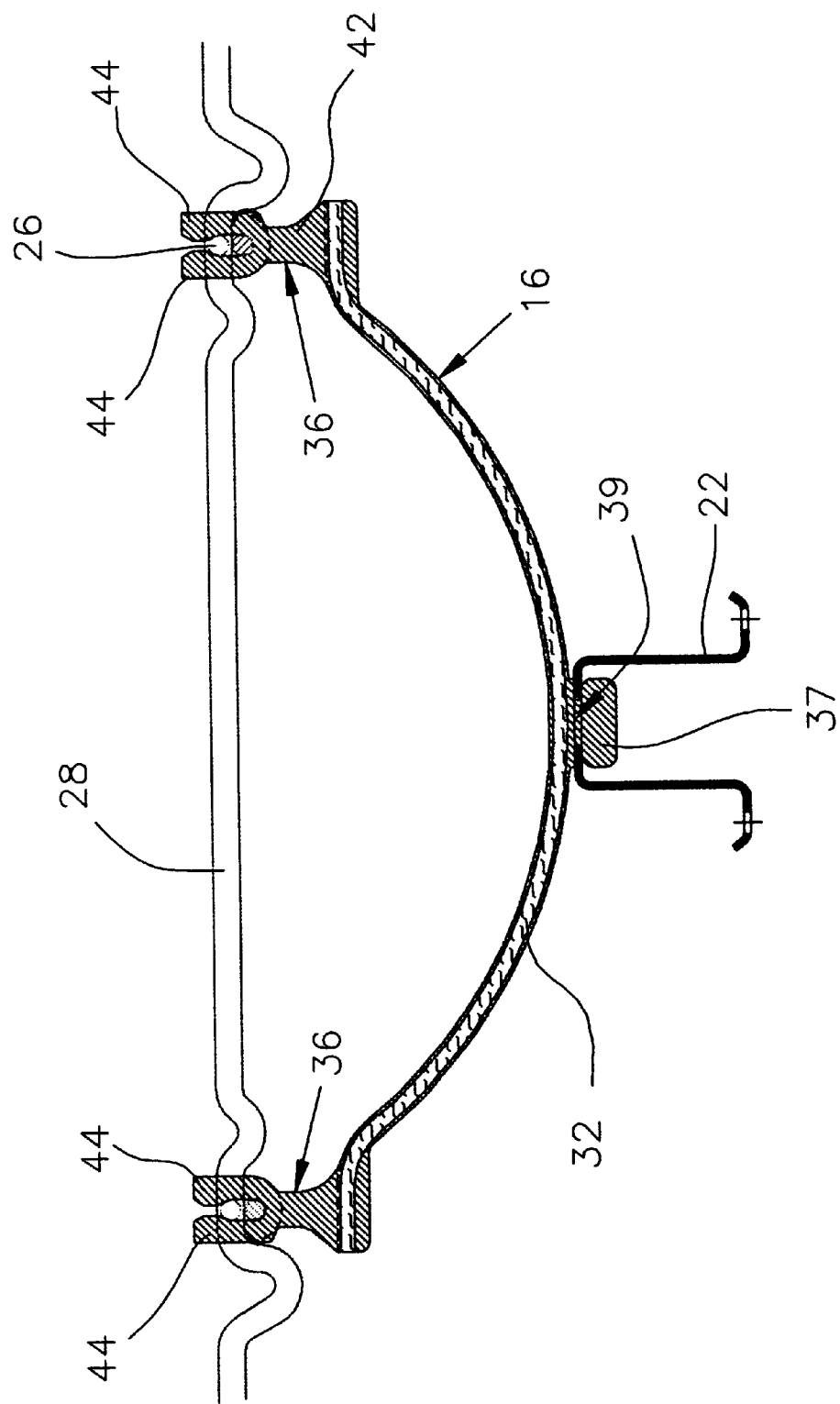
FIG. 6C is an elevation view of a spring module of the invention engaged with a frame member and a grid in a mattress foundation of the present invention.
Figure 6D:
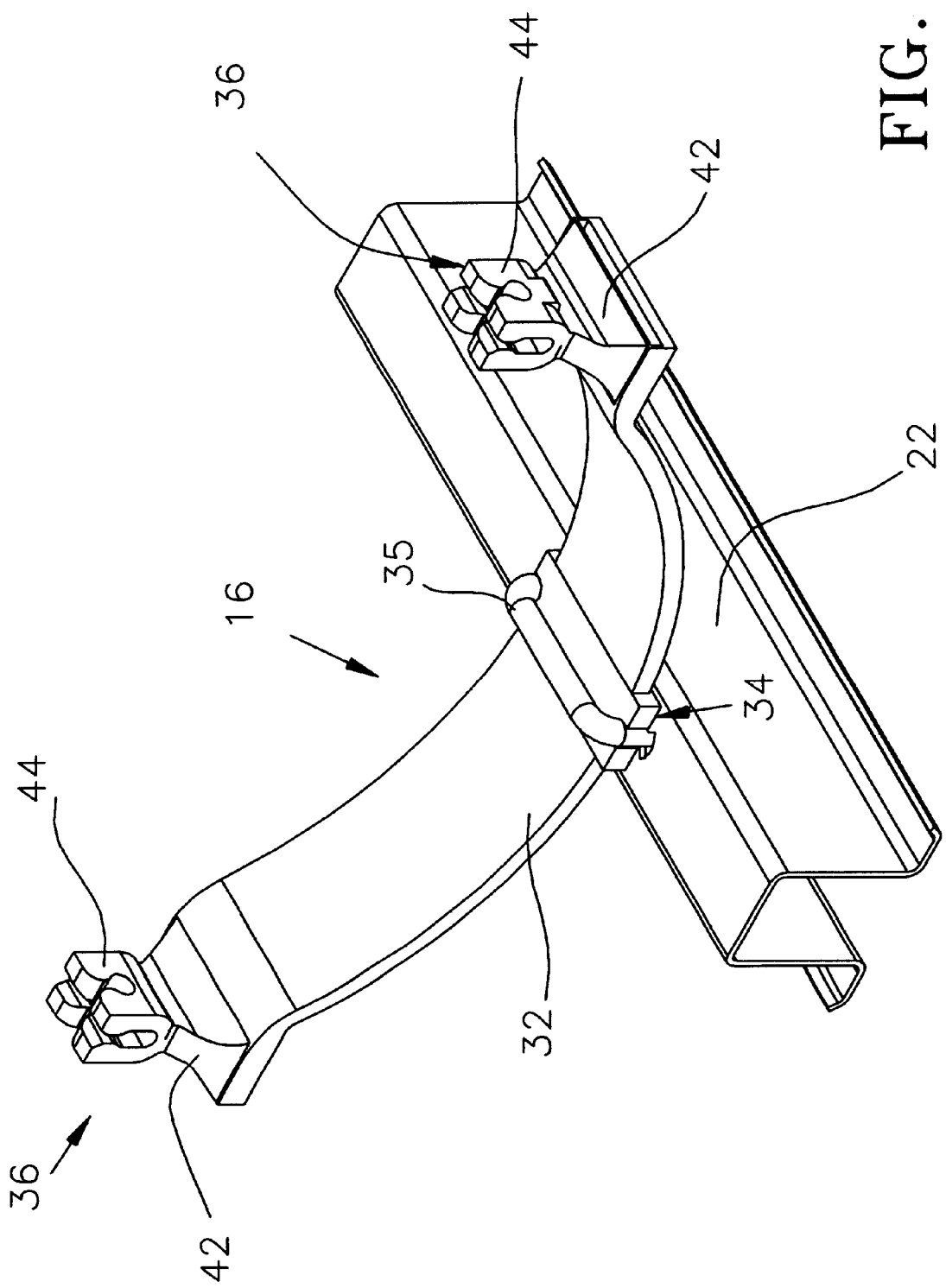
FIG. 6D is a perspective view of an alternate embodiment of a spring module of the invention attached to a frame member of a mattress foundation.

The frame attachment fitting 34 is preferably configured for indexed engagement with an opening in the top of longitudinal frame members 22. For example, a key 37 is formed on the bottom of frame attachment fitting 34 with a length generally aligned with the length of the module body 32. A correspondingly sized hole is provided in the top of the upper longitudinal frame members 22 through which the key 37 is passed and then rotated ninety degrees to mechanically engage with the supporting frame member. For example, a neck 39 (shown in FIGS. 6A and 6B) extending from key 37 has a length dimension greater than a width dimension of the hole in frame member 22 so that edges of the hole impinge upon the neck as it is rotated ninety degrees within the hole, to mechanically and frictionally engage the module with the frame member. Similarly, as shown in FIG. 6A, the length of key 37 may be made longer than the internal width of the channel form of longitudinal member 22 to achieve a binding compression fit of the key along a length dimension with the frame member 22 upon ninety degree rotation. Alternatively, the hole in frame member 22 can be dimensioned at one point to receive the key 37 and neck 39 with clearance, and further include an adjacent smaller area which captures the key when the entire module is slid into the smaller area of the hole. A key configured for sliding engagement in a frame member hole is shown in FIGS. 6B and 6C.

This simple manner of attachment of the modules to the frame structure with the integrally formed attachment fittings 34 and 36 eliminates the need for any separate fasteners to secure the modules to the frame. The fittings 34 and 36 enable extremely simple and fast attachment of the modules 16 to the frame and the overlying grid. The interlocking mechanical engagement of the attachment fittings of the spring modules with a mattress foundation or any other structure such as seating and furniture, is ideally suited for either manual or automated assembly of the foundations of the invention. Also, the inherent flexibility of the fittings 34 and 36 formed of flexible/plastic material (and preferably of a material more flexible than the non-fiber material of the spring body) gives the entire spring module multiple degrees of freedom relative to the frame and grid, and eliminates any possibility of noise generation at the points of connection of the attachment fittings to a frame or grid.

The described foundation as depicted in FIG. 2 has a relatively low height or profile for the reason that the overall height, measured from the bottom surface of the frame to the top of the grid, is substantially less than the height of conventional foundations having wire spring modules which stand as tall as seven or more inches high. The low profile height dimension of the foundation of the invention is attainable as a result of the minimal height dimension of the composite material spring modules 16 and attachment fittings, yet which have deflection characteristics comparable and superior to wire form springs with substantially greater height.

Figure 4:
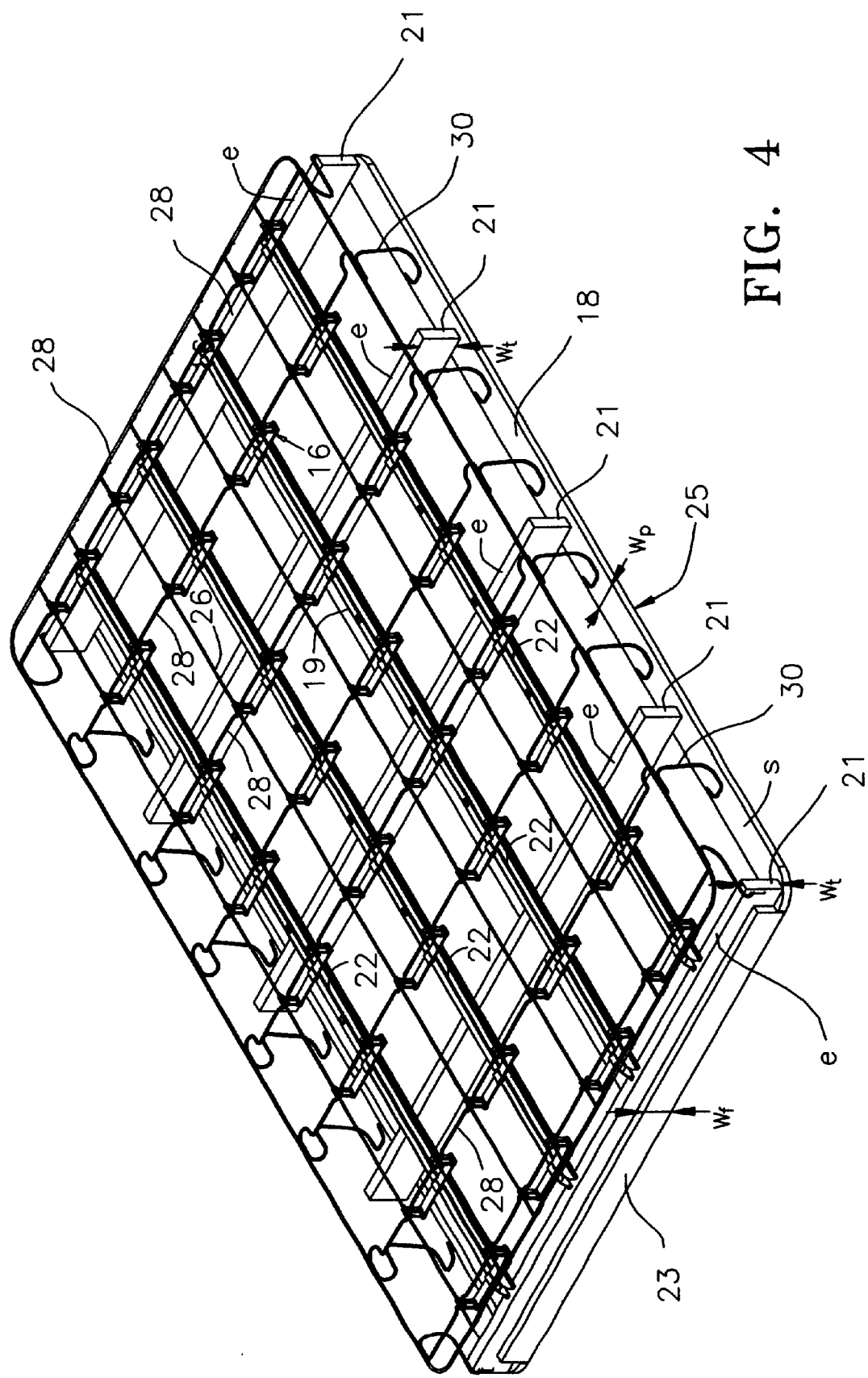
FIG. 4 is a perspective view of a high profile mattress foundation with composite material springs with integrally formed attachment fittings of the present invention.

Nonetheless, the foundation 10 can be constructed with any desired height dimension wherein the modules 16 are free to deflect about the point of attachment to the supporting frame members 22. FIG. 4 illustrates a relatively high profile version of the foundation 10 having a high profile frame, indicated generally at 25, wherein the transverse frame members 21 are oriented with a major width w, oriented vertically to achieve a greater height dimension which elevates the longitudinal frame members 22 (and spring modules 16) mounted on narrow edge e. In other words, the perimeter members 18 are flat, while the transverse members 21 are upright. The narrow bottom edges of the transverse members 21 rest upon the top surfaces or major widths $w_p$, of the longitudinal perimeter frame members 18 and central longitudinal member 19. The upper longitudinal frame members 22 are attached to the narrow top edges e of the transverse members 21. End facia strips 23 are similarly vertically oriented along the side of the end transverse members 21, with a major width wt oriented vertically, perpendicular to the major widths $Wp_p$ of the longitudinal members, and the narrow bottom edges of the transverse members flush with the bottom of the longitudinal perimeter frame members 18. This construction provides a very stiff frame with the transverse ends reinforced by side-by-side vertically oriented double board thickness. Of course, the rigidity of the transverse members 21 is optimized by loading upon the narrow edges e, on which the longitudinal frame members 22 rest. Additional frame members may be used to achieve even greater heights and stiffness. In a high profile foundation constructed with the high profile frame 25, the vertical support elements 30 of the transverse grid elements 28 are increased in height to extend from the elevated grid down to the longitudinal perimeter frame members 18.

Figure 5:
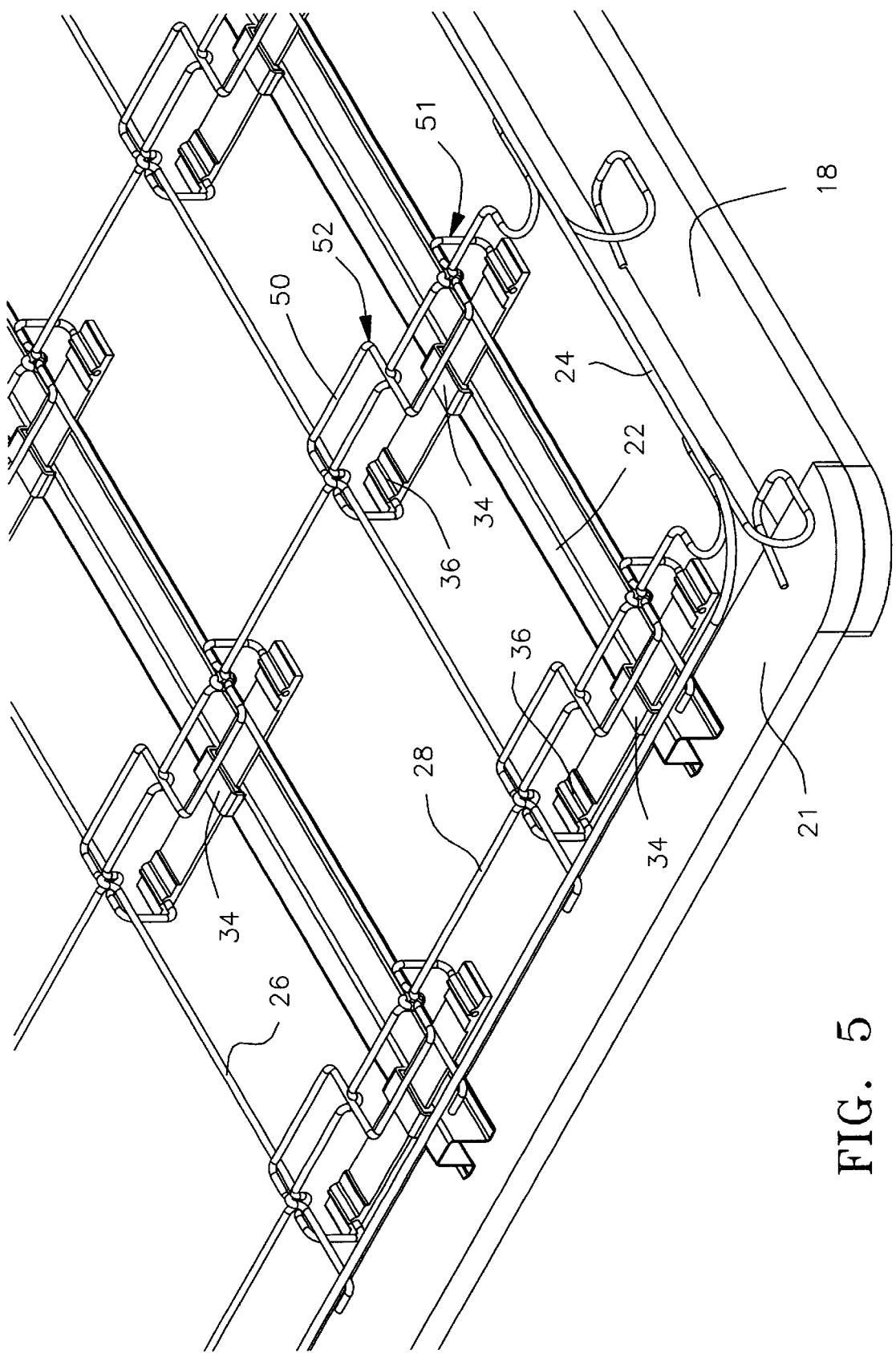
FIG. 5 is a perspective view of a portion of an alternate embodiment of a mattress foundation of the present invention.

Alternatively, the length of upright members 42 of the grid attachment stanchion fittings 36 can be designed to produce any reasonable desired height of the grid over the spring modules and uppermost members of the frame. For example, FIG. 5 illustrates another embodiment wherein the grid attachment stanchion fittings 36 are replaced by a single grid attachment wire 50, the ends 51 of which are formed to engage with an alternate form of attachment fitting 36 and up to the grid interlockingly engaged by an intermediate section 52 between ends 51. The vertical extent of ends 51 can of course be selectively varied in manufacture to produce a foundation of the desired height.

The fundamental concept of the invention of integrally forming attachment fittings with a composite material spring module body can be executed with spring module bodies of any configuration. For example, FIGS. 6A–6D illustrate generally U-shaped or C-shaped configurations of the spring module 16 which have a generally curved body 32 with two generally flat coplanar spring ends from which the grid attachment stanchion fittings 36 extend vertically, with the frame attachment fitting 34 at the approximate center of the body 32. In addition, the U-shape spring module is configured and made from a material such that it can be compressed to an essentially planar position without reaching its "spring set" condition. Accordingly, even if the inventive bed foundation is subjected to excessive load conditions, the U-shape spring modules will not be deformed or otherwise caused to fail because even at maximum deflection they will not take a spring set.

FIG. 6B illustrates a U-shaped spring module 16 mounted upon a frame member 22 by insertion of key 37 through a hole in the frame member as described above, and the frictional engagement of the intersecting grid wires by the grid attachment stanchion fittings 36 as also described above. As shown in FIG. 6C, an additional mechanical fastener 35, such as in the form of a wire form or staple, may be attached across fitting 34 to further secure the module to the frame member. For such fastener securement, as shown in FIGS. 1A and 1B, an indexing groove 38 may be provided in fitting 34 to receive fastener 35, as shown secured to a frame member in FIG. 6D. For fastener securement of the spring module to, for example, a planar surface of a support structure such as a frame member, the key 37 and neck 39 could be eliminated to achieve flush stable mounting. In this case the body of the frame attachment fitting 34 in which groove 38 is formed still performs an attachment function or seating the fastener.

Figure 7:
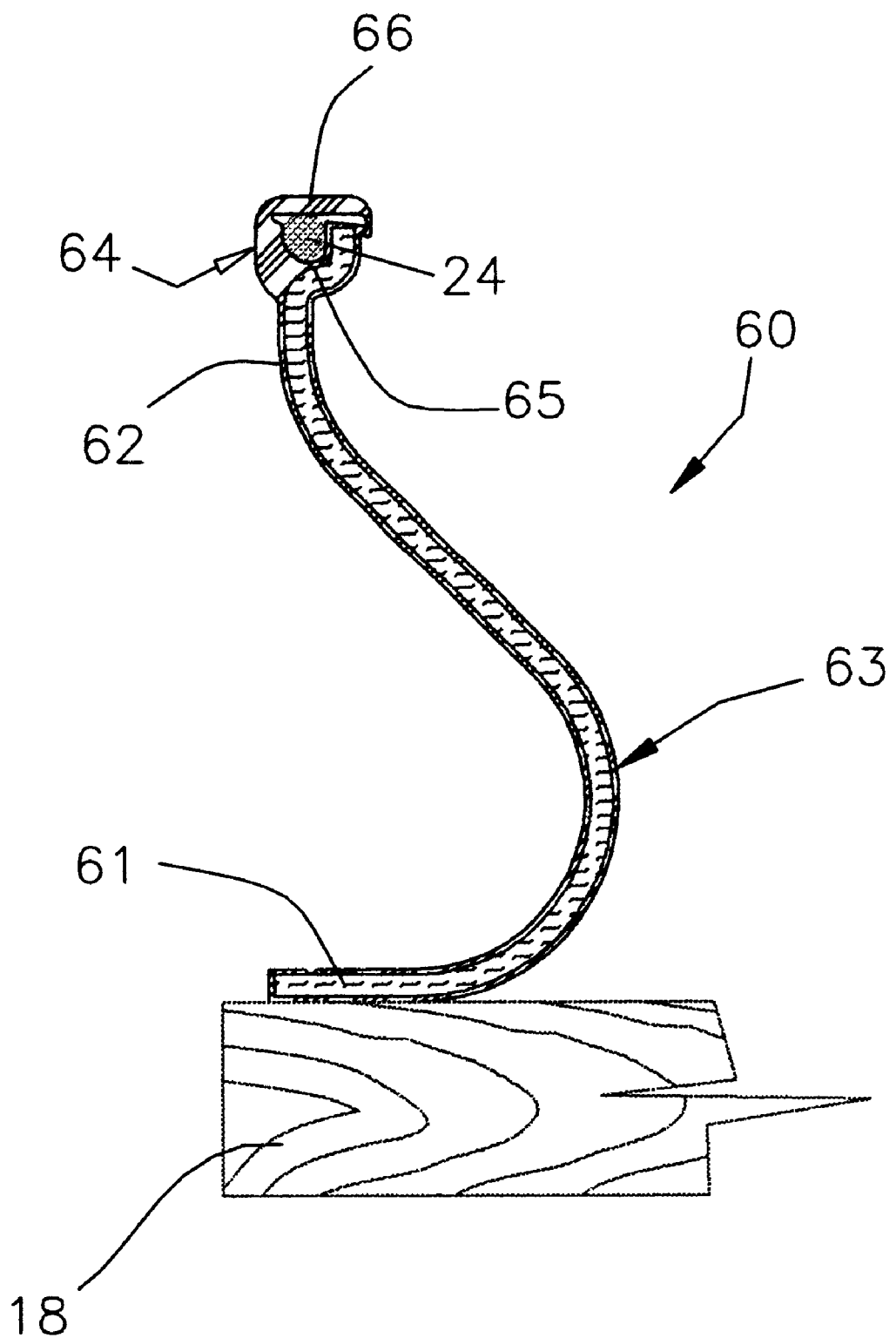
FIG. 7 is a cross-sectional view of a mattress foundation grid borderwire support spring of the present invention.

In combination with the reflexive spring action of modules 16 mounted to frame 12 and grid 14 in this manner, support elements 30 of transverse wires 28 provide a dual spring/support action to the foundation. Because support elements 30 may be formed of steel wire or polymeric material, they may have a spring rate different from the modules 16, especially modules formed of composite material. The combination of these two different spring elements with different spring rates gives the foundation an unique and improved dual spring rate and action. For example, the wire support elements 30 may be substituted with a composite material spring 60 such as depicted in FIG. 7. The composite material grid support spring 60 is formed with a generally planar mounting base 61 for attachment to a frame member and an upright 62 which vertically supports the borderwire 24 of grid 14. An intermediate section 63 may be configured in any suitable geometry which provides the desired deflection and spring characteristics. At the top of upright 62 is an attachment fitting 64 having a channel 65 for receiving the borderwire 24 and a retainer cap 66 which fits over the channel to retain the borderwire in channel 65. Furthermore, since the inventive design may use a high carbon grid, the grid itself acts as a spring to fully return to the horizontal plane when a load is removed, unlike low carbon welded grids which can permanently bend and deform and break under load.

In the manufacturing and assembly methods and processes of the invention, the assembly of the composite material mattress foundation system is highly flexible and greatly simplified by the relatively small size and simple geometry of the spring modules. For example, to selectively assemble a composite material mattress foundation of the invention the following steps are performed in any logical order. The spring modules 16 may be attached to the inner frame members (such as frame members 22) before or after attachment of the inner frame members to the other frame members. The spring modules are secured to the frame members by insertion of the key 37 through the frame member key hole and rotated 90 degrees to a locked position. The number of spring module attachment points (e.g., holes for receiving keys 37) will determine the maximum number of modules which one frame member can support. For example, a single frame member may include as many as forty module or more attachment points, though only twenty or fewer evenly spaced modules may be attached in the assembly process.

The type of spring modules used may be selected by shape and/or color (indicating spring rate) to be of either uniform or dissimilar spring properties. For example, modules of a higher spring rate may be placed in the hip and/or back regions of the foundation and lower spring rates near the ends. Similarly, stiffer spring modules can be located at the perimeter of the foundation to provide greater support of the mattress edge where people sit. The grid 14 is then secured to each of the grid attachment stanchion fittings 36 of the modules 16 by top or side entry engagement of the grid intersections (of elements 26 and 28) with the stanchion gripping fingers 44, as described above. Padding and covering is then attached. Each of the assembly steps lends itself to automation given the small size, light weight and simple geometry of the spring modules, and the elimination of dimensional constraints dictated by awkward multiple bend steel wire springs.

Although the invention has been described in detail with respect to certain preferred and alternate embodiments, it will be appreciated to those of skill in the art that certain modifications and variations of the inventive principles disclosed. In particular, it will be acknowledged that the composite material spring modules with integrally formed attachment fittings can be attached to or utilized with any support structure or frame and elements or members of any overlying structure such as a grid or matrix design to transfer loads to the springs, such as for example, but not limited to frame and structures as found in mattresses, furniture, seating, dampening devices, and any structure or assembly where a reflexive weight or load bearing surface is required.

Also, any form of attachment fittings which are integrally formed with or bonded to the spring body and configured for attachment to a member which supports the spring module, and for attachment to a structure supported by the spring module is well within the scope of the invention. All such variations and modifications are within the scope and purview of the invention as defined for now by the accompanying claims and all equivalents thereof.

What is claimed is:

1. A single piece composite material spring module comprising:
    an elongate spring body made of composite material including a first plastic material and a fiber; and
    attachment fittings made of a second plastic material integrally formed about and substantially encapsulating the spring body, said attachment fittings comprising:
    grid attachment fittings formed at each end of said spring body, generally perpendicular to said spring body, and spaced apart from said spring body by a stanchion, said grid attachment fittings having gripping elements configured for attachment to an overlying grid, and
    at least one frame attachment fitting configured for indexed engagement with an underlying frame member.

2. The composite material spring module of claim 1 wherein the plastic of the spring body is a vinyl ester and the fiber of the spring body is fiberglass.

3. The composite material spring module of claim 1 wherein the fiber of the spring body is oriented to extend generally along a length of the spring body.

4. The composite material spring module of claim 1 wherein the fiber of the spring body extends substantially the entire length of the spring body.

5. The composite material spring module of claim 1 wherein the fiber of the spring body includes a plurality of fiber strands.

6. The composite material spring module of claim 1 wherein the fiber of the spring body includes a plurality of fibers of length generally shorter than a length of the spring body.

7. The composite material spring module of claim 6 wherein the fibers are randomly arranged within the plastic of the spring body.

8. The composite material spring module of claim 1 wherein the attachment fittings are formed of a plastic different than the plastic of the spring body.

9. The composite material spring module of claim 8 wherein the plastic of the attachment fittings is selected from a group consisting of polypropylene, polyethylene, nylon and ABS.

10. The composite material spring module of claim 1 wherein the grid attachment fittings comprise gripping elements configured for lateral engagement with an overlying grid.

11. The composite material spring module of claim 10 wherein the gripping elements of the grid attachment fittings are configured to frictionally engage elements of an overlying grid.

12. The composite material spring module of claim 1 wherein the spring body is generally planar.

13. The composite material spring module of claim 1 wherein the spring body is generally curvilinear.

14. The composite material spring module of claim 10 wherein the gripping elements of the grid attachment fittings are spaced apart to define channels wherein elements of a structure supported by the spring modules are received.

15. The composite material spring module of claim 10 wherein the gripping elements comprise radiused heads which frictionally engage elements to which the grid attachment fittings attach.

16. The composite material spring module of claim 1 wherein the grid attachment fittings have top openings through which elements can be inserted into the grid attachment fittings.

17. The composite material spring module of claim 1 wherein the grid attachment fittings have internal cavities and side openings adjacent to the internal cavities through which elements can be inserted into the grid attachment fittings.

18. The composite material spring module of claim 1, further comprising an indexing groove configured to receive a fastener.

19. The composite material spring module of claim 1 wherein the frame attachment fitting is a key configured for engagement with a hole in an underlying frame member.

20. The composite material spring module of claim 19 wherein the key has a length dimension generally greater than a width dimension.

21. The composite material spring module of claim 19 wherein the key has a length generally aligned with the length of the spring body.

22. The composite material spring module of claim 19 wherein the key has a length generally perpendicular to the length of the spring body.

23. A single piece composite material spring module for use in a mattress foundation having a frame and a grid, the spring module configured for attachment to an underlying frame and to an overlying grid, the spring module comprising:
   an elongate spring body made of composite material including a first plastic material and a fiber; and
   attachment fittings made of a second plastic material integrally formed about and substantially encapsulating the spring body, said attachment fittings comprising:
   grid attachment fittings formed at each end of said spring body, generally perpendicular to said spring body, and spaced apart from said spring body by a stanchion, said grid attachment fittings having gripping elements configured for attachment to the overlying grid, and
   at least one frame attachment fitting configured for indexed engagement with the underlying frame.

24. The composite spring module of claim 23 wherein the spring body is generally linear and oriented generally parallel to the frame and the grid when attached to the frame and to the grid.

25. The composite spring module of claim 23 wherein the frame attachment fitting is formed on one side of the spring body and the grid attachment fittings are formed on an opposite side of the spring body.

26. The composite spring module of claim 23 wherein the attachment fittings are molded from a plastic different than the plastic of the spring body.

27. The composite spring module of claim 23 wherein the attachment fittings are configured for interlocking engagement with the frame and the grid of the mattress foundation.

28. The composite spring module of claim 23 wherein the attachment fittings are flexible relative to the spring body.

29. The composite spring module of claim 23 wherein the spring body comprises multiple fibers which extend substantially an entire length of the spring body.

30. The composite spring module of claim 23 wherein the spring body comprises multiple fibers of generally random orientation within the spring body.

31. The composite spring module of claim 23 wherein at least one of the grid attachment fittings comprise a flexible hinge, whereby the grid attachment fitting can move in response to movement of the grid or spring body.

32. The composite spring module of claim 23 wherein the frame attachment fitting comprises a neck and a key configured for locking engagement with a frame element of the mattress foundation frame.

33. The composite spring module of claim 23 wherein the grid attachment fitting comprises gripping fingers configured for locking engagement with the grid of the mattress foundation.

34. The composite spring module of claim 23 wherein the attachment fittings have radiused heads.

35. A composite material mattress foundation comprising:
   a foundation frame having interconnected perimeter, transverse and longitudinal members;
   a grid parallel to and spaced from the foundation frame;
   a plurality of single piece composite material spring modules, each spring module comprising
   an elongate spring body made of composite material including a first plastic material and a fiber, and
   attachment fittings made of a second plastic material integrally formed about and substantially encapsulating the spring body, said attachment fittings comprising
   grid attachment fittings formed at each end of said spring body, generally perpendicular to said spring body, and spaced apart from said spring body by a stanchion, said grid attachment fittings having gripping elements attached to an overlying grid, and
   at least one frame attachment fitting configured for indexed engagement with the foundation frame, the attachment member mechanically engaged with the foundation frame.

36. The composite material mattress foundation of claim 35 wherein each of the spring modules comprise substantially continuous fibers which extend substantially an entire length of the body of the spring module.

37. The composite material mattress foundation of claim 35 wherein each of the spring modules comprise an array of fibers in the spring body.

38. The composite material mattress foundation of claim 35 wherein the attachment fittings of the spring modules are formed of a plastic material different than a plastic material of the spring body.

39. The composite material mattress foundation of claim 35 wherein the frame attachment fitting of the spring modules comprises a key and a neck which extends from the spring body.

40. The composite material mattress foundation of claim 35 wherein the grid attachment fitting of the spring modules comprises gripping fingers configured to grip the grid.

41. The composite material mattress foundation of claim 35 wherein the grid attachment fittings of the spring modules comprise a flexible hinge spaced from the gripping fingers.

42. The composite material mattress foundation of claim 38 wherein the plastic material which forms the attachment fittings of the spring modules covers substantially the entire spring body.

43. The composite material mattress foundation of claim 38 wherein the plastic material which forms the attachment fittings of the spring modules surrounds only a portion of the spring body.

44. The composite material mattress foundation of claim 35 wherein the grid is formed of composite material.

45. A single piece composite material spring module comprising:

a spring body made of composite material including a first plastic material and a fiber; and attachment fittings made of a second plastic material and separately permanently molded about and substantially encapsulating th spring body, said attachment fittings comprising grid attachment fittings formed at each end of said spring body, generally perpendicular to said spring body, and spaced apart from said spring body by a stanchion, said grid attachment fittings having gripping elements attached to an overlying grid, and at least one frame attachment fitting configured for indexed engagement with the foundation frame, the attachment member mechanically engaged with the foundation frame, wherein the composite material spring is formed by the process of:

encapsulating a plurality of fibers within a first plastic material to form a composite material spring body with encapsulated fibers, inserting the composite material spring body into a mold having mold cavities in the form of at least two attachment fittings formed at each end of the spring body, generally perpendicular to the spring body, and generally spaced apart from the spring body, and integrally forming about and substantially encapsulating the spring body with a moldable material by injecting the mold cavity with the moldable material.

* * * * *